United States Patent
Lee et al.

(10) Patent No.: US 9,520,624 B2
(45) Date of Patent: Dec. 13, 2016

(54) BATTERY MODULE WITH COMPACT STRUCTURE AND EXCELLENT HEAT RADIATION CHARACTERISTICS AND MIDDLE OR LARGE-SIZED BATTERY PACK EMPLOYED WITH THE SAME

(71) Applicant: LG CHEM, LTD., Seoul (KR)

(72) Inventors: BumHyun Lee, Seoul (KR); DalMo Kang, Daejeon (KR); Jong Moon Yoon, Daejeon (KR); Jin Kyu Lee, Daejeon (KR); Yong Shik Shin, Daejeon (KR); HeeSoo Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 89 days.

(21) Appl. No.: 13/764,799

(22) Filed: Feb. 12, 2013

(65) Prior Publication Data
US 2013/0149576 A1    Jun. 13, 2013

Related U.S. Application Data

(63) Continuation of application No. PCT/KR2011/005890, filed on Aug. 11, 2011.

(30) Foreign Application Priority Data

Aug. 16, 2010  (KR) .......................... 10-2010-0078623

(51) Int. Cl.
*H01M 10/50* (2006.01)
*H01M 10/613* (2014.01)
(Continued)

(52) U.S. Cl.
CPC ...... *H01M 10/5004* (2013.01); *B60L 11/1874* (2013.01); *B60L 11/1879* (2013.01);
(Continued)

(58) Field of Classification Search
USPC .............................................. 429/120, 72, 83
See application file for complete search history.

(56) References Cited

U.S. PATENT DOCUMENTS 5,678,760 A * 10/1997 Muso .................... B60K 11/02
                                                       165/41
5,756,227 A    5/1998 Suzuki et al.
(Continued)

FOREIGN PATENT DOCUMENTS

DE      202010006683 U1    9/2010
EP           2573860 A2    3/2013
(Continued)

OTHER PUBLICATIONS

International Search Report issued in PCT/KR2011/005890, mailed on Apr. 4, 2012.

*Primary Examiner* — Ula C Ruddock
*Assistant Examiner* — Osei Amponsah
(74) *Attorney, Agent, or Firm* — Birch, Stewart, Kolasch & Birch, LLP

(57) ABSTRACT

Disclosed herein is a battery module configured to have a structure in which a plurality of battery cells, each of which includes an electrode assembly of a cathode/separator/anode structure mounted in an electrode assembly receiving part, is mounted in a module case in a state in which the battery cells are arranged in a lateral direction such that the electrode assembly receiving parts of the respective battery cells are adjacent to one another, wherein a plurality of cooling members is disposed between the battery cells, and each of the cooling members includes a heat dissipation fin disposed between adjacent electrode assembly receiving parts in a tight contact state and a coolant conduit configured to have a hollow structure in which a coolant flows and mounted to
(Continued)

the heat dissipation fin along outer edges of each of the electrode assembly receiving parts.

13 Claims, 3 Drawing Sheets

(51) Int. Cl.
*B60L 11/18* (2006.01)
*H01M 10/625* (2014.01)
*H01M 10/647* (2014.01)
*H01M 10/6551* (2014.01)
*H01M 10/6557* (2014.01)
*H01M 10/6567* (2014.01)
*H01M 2/02* (2006.01)
*H01M 10/04* (2006.01)
*H01M 2/10* (2006.01)

(52) U.S. Cl.
CPC ....... *H01M 10/613* (2015.04); *H01M 10/625* (2015.04); *H01M 10/647* (2015.04); *H01M 10/6551* (2015.04); *H01M 10/6557* (2015.04); *H01M 10/6567* (2015.04); *H01M 2/0212* (2013.01); *H01M 2/0287* (2013.01); *H01M 2/1077* (2013.01); *H01M 10/0413* (2013.01); *Y02T 10/705* (2013.01); *Y02T 10/7005* (2013.01)

(56) References Cited

U.S. PATENT DOCUMENTS

| | | | |
|---|---|---|---|
| 6,042,961 | A | 3/2000 | Verhoog et al. |
| 6,512,347 | B1 * | 1/2003 | Hellmann et al. ............ 320/107 |
| 2006/0240318 | A1 | 10/2006 | Kim et al. |
| 2009/0208828 | A1 | 8/2009 | Kanai et al. |
| 2009/0253026 | A1 * | 10/2009 | Gaben ............................ 429/56 |
| 2009/0325059 | A1 | 12/2009 | Niedzwiecki et al. |
| 2011/0008665 | A1 * | 1/2011 | Yoon ................... H01M 2/0265 429/120 |
| 2012/0263984 | A1 | 10/2012 | Krammer |

FOREIGN PATENT DOCUMENTS

| | | | | |
|---|---|---|---|---|
| EP | 2573861 A2 | 3/2013 | | |
| JP | 8-148187 A | 6/1996 | | |
| JP | 2004-103258 A | 4/2004 | | |
| JP | 2008-62875 A | 3/2008 | | |
| JP | 2009-009853 | * | 1/2009 | ............ H01M 10/50 |
| JP | 2009-9853 A | 1/2009 | | |
| JP | 2009-9889 A | 1/2009 | | |
| KR | 10-2009-0107443 A | 10/2009 | | |
| KR | 10-2010-0041452 A | 4/2010 | | |
| WO | WO 2006/135008 A1 | 12/2006 | | |
| WO | WO 2010/002142 A2 | 1/2010 | | |
| WO | WO 2011/073424 A1 | 6/2011 | | |

* cited by examiner

BATTERY MODULE WITH COMPACT STRUCTURE AND EXCELLENT HEAT RADIATION CHARACTERISTICS AND MIDDLE OR LARGE-SIZED BATTERY PACK EMPLOYED WITH THE SAME

CROSS REFERENCE TO RELATED APPLICATIONS

This application is a Continuation of PCT International Application No. PCT/KR2011/005890 filed on Aug. 11, 2011, which claims priority under 35 U.S.C. §119(a) to patent application Ser. No. 10-2010-0078623 filed in the Republic of Korea on Aug. 16, 2010, all of which are hereby expressly incorporated by reference into the present application.

TECHNICAL FIELD

The present invention relates to a battery module having a compact structure and excellent heat dissipation efficiency and a middle or large-sized battery pack including the same, and, more particularly, to a battery module configured to have a structure in which a plurality of battery cells, each of which includes an electrode assembly mounted in an electrode assembly receiving part, is mounted in a module case in a state in which the battery cells are arranged in a lateral direction such that the electrode assembly receiving parts of the respective battery cells are adjacent to one another, wherein a plurality of cooling members are disposed between the battery cells, and each of the cooling members includes a heat dissipation fin disposed between adjacent electrode assembly receiving parts in a tight contact state and a coolant conduit configured to have a hollow structure in which a coolant flows and mounted to the heat dissipation fin along outer edges of each of the electrode assembly receiving parts, and a middle or large-sized battery pack including the same.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member (battery case), because the pouch-shaped battery is lightweight, the manufacturing costs of the pouch-shaped battery are low, and it is easy to modify the shape of the pouch-shaped battery.

Battery cells constituting such a middle or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof with the result that it is difficult to effectively lower the overall temperature of the battery cells.

If the heat, generated from the battery module during the charge and discharge of the battery module, is not effectively removed from the battery module, the heat accumulates in the battery module with the result that deterioration of the battery module is accelerated. According to circumstances, the battery module may catch fire or explode. For this reason, a cooling system is needed in a middle or large-sized battery pack for vehicles, which is a high-power, large-capacity battery including a plurality of middle or large-sized battery modules, to cool battery cells mounted in the battery pack.

Each battery module mounted in a middle or large-sized battery pack is generally manufactured by stacking a plurality of battery cells with high integration. In this case, the battery cells are stacked in a state in which the battery cells are arranged at predetermined intervals such that heat generated during the charge and discharge of the battery cells is removed. For example, the battery cells may be sequentially stacked in a state in which the battery cells are arranged at predetermined intervals without using an additional member. Alternatively, in a case in which the battery cells have low mechanical strength, one or more battery cells may be mounted in a cartridge to constitute a unit module, and a plurality of unit modules may be stacked to constitute a battery module. Consequently, the mechanical strength of the battery module is increased through the use of the cartridges, but the total size of the battery module is increased.

Also, coolant channels may be defined between the stacked battery cells or between the stacked battery modules such that heat accumulating between the stacked battery cells or between the stacked battery modules is effectively removed.

Particularly in a case in which the cooling structure is based on a water cooling type cooling system, a plurality of coolant channels is defined between the battery cells or between the battery modules with the result that it is very difficult to design the cooling structure. In addition, if a cooling member or a heat conduction member is mounted to a specific region of the batter pack to constitute the cooling structure, the overall size of the battery pack is further increased.

Consequently, there is a high necessity for a battery pack in which battery cells are mounted without using a cartridge, which provides high-power, large-capacity electricity, which can be manufactured in a simple and compact structure, and which exhibits excellent cooling efficiency and safety.

DISCLOSURE

Technical Problem

Therefore, the present invention has been made to solve the above problems, and other technical problems that have yet to be resolved.

Specifically, it is an object of the present invention to provide a battery module configured to have a structure in which cooling members including coolant conduits mounted to heat dissipation fins are disposed between battery cells, thereby maximizing cooling efficiency of the battery module.

It is another object of the present invention to provide a battery module configured to have a structure in which coolant conduits extend along outer edges of electrode assembly receiving parts such that the coolant conduits can be used as members to fix battery cells and improve mechanical strength of the battery cells.

Technical Solution

In accordance with one aspect of the present invention, the above and other objects can be accomplished by the provision of a battery module configured to have a structure in which a plurality of battery cells, each of which includes an electrode assembly of a cathode/separator/anode structure mounted in an electrode assembly receiving part, is mounted in a module case in a state in which the battery cells are arranged in a lateral direction such that the electrode assembly receiving parts of the respective battery cells are adjacent to one another, wherein a plurality of cooling members are disposed between the battery cells, and each of the cooling members includes a heat dissipation fin disposed between adjacent electrode assembly receiving parts in a tight contact state and a coolant conduit configured to have a hollow structure in which a coolant flows and mounted to the heat dissipation fin along outer edges of each of the electrode assembly receiving parts.

The heat dissipation fins are mounted at interfaces between the respective battery cells, and the coolant conduits are mounted to the respective heat dissipation fins. Consequently, heat generated from the battery cells is conducted to the heat dissipation fins, and the heat dissipation fins, which have been heated by the heat generated from the battery cells, are directly cooled by the coolant conduits in which the coolant flows, thereby achieving high cooling efficiency without using an additional member, such as a heat conduction member.

Also, the coolant conduits are mounted to the respective heat dissipation fins along the outer edges of the electrode assembly receiving parts to fix the battery cells. Even in a case in which the battery cells are not mounted in an additional cartridge, therefore, it is possible to provide a structure in which the battery cells are stably stacked and to improve mechanical strength of the battery cells. Consequently, it is possible to configure a battery module which exhibits excellent structural stability and has a very compact structure.

Preferably, each of the battery cells is a plate-shaped battery cell, which has a small thickness and a relatively large width and length such that the total size of the battery module is minimized when the battery cells are stacked to constitute the battery module. A preferred example of such a plate-shaped battery cell may be a secondary battery configured to have a structure in which an electrode assembly is mounted in an electrode assembly receiving part formed at a battery case formed of a laminate sheet including a metal layer and a resin layer, and a sealed portion ('outer edge sealed portion'), sealed by thermal welding, is formed at the outer edges of the electrode assembly receiving part. A secondary battery having the above structure may be referred to as 'a pouch-shaped battery cell'.

In the structure in which the coolant conduit is mounted to the heat dissipation fin along the outer edges of each of the electrode assembly receiving parts as described above, the coolant conduit may be disposed throughout the outer edges of the electrode assembly receiving part or at some of the outer edges of the electrode assembly receiving part. In a case in which each of the battery cells includes an electrode assembly receiving part having, for example, four edges as shown in FIG. 1, therefore, the coolant conduit may be disposed so as to correspond to one edge, two edges, three edges, or four edges of the electrode assembly receiving part.

The cooling member may include one coolant conduit. Alternatively, the cooling member may include two or more coolant conduits. In addition, the two or more coolant conduits may be disposed at outer edges of different electrode assembly receiving parts or may be partially or entirely disposed at outer edges of the same electrode assembly receiving part. In this case, flow directions of the coolant in the two or more coolant conduits may be the same or opposite to each other. Also, the positions of the coolant input ports and the coolant outlet ports may be changed based on how to install the coolant conduits. All of the various structures as described above fall into the scope of the present invention.

According to the present invention, the coolant conduit of each of the cooling members may be disposed on the outer edge sealed portion. When the cooling members are disposed between the respective battery cells, therefore, the coolant conduits mounted to the respective heat dissipation fins improve structural stability of the battery cells and effectively fix the cooling members to the battery cells.

The material for each of the cooling members is not particularly restricted so long as the cooling member is formed of a material exhibiting high thermal conductivity to improve cooling efficiency. For example, the cooling member may be formed of a metallic material exhibiting high thermal conductivity.

In a preferred example, the heat dissipation fin of each of the cooling members may be formed in the shape of a plate, and the coolant conduit may penetrate the heat dissipation fin in parallel.

That is, each of the cooling members is configured to have a structure in which contact area between the coolant conduit, in which the coolant flows, and the heat dissipation fin is maximized as the coolant conduit penetrates the heat dissipation fin, and therefore, it is possible to more effectively remove heat generated from the battery cells.

Each of the cooling members includes the heat dissipation fin and the coolant conduit having specific structures as defined above, and the heat dissipation fin and the coolant conduit are preferably integrated to further improve cooling efficiency.

In a case in which the coolant conduit, in which the coolant flows, and the heat dissipation fin are integrated as described above, it is possible to prevent the occurrence of thermal conduction resistance between the heat dissipation fin and the coolant conduit, thereby more effectively cooling the battery cells.

Preferably, the coolant conduit is bent in tight contact with the outer edges of the electrode assembly receiving part.

That is, each of the cooling members is effectively fixed by the coolant conduit bent along the outer edges of the electrode assembly receiving part to increase force to support the battery cells. During construction of the battery module, therefore, it is not necessary to use an additional member to fix the battery cells. Also, when the cooling members are disposed between the respective battery cells, the heat dissipation fins are disposed in tight contact with the outer surfaces of the respective battery cells, thereby achieving a heat dissipation effect based on thermal conduction.

In an example, the height of the coolant conduit may be equal to the sum of heights of outer edges of adjacent electrode assembly receiving parts in a state in which the heat dissipation fin is disposed between the adjacent electrode assembly receiving parts to effectively support and fix the electrode assembly receiving parts from the outside.

If the sum of heights of outer edges of adjacent electrode assembly receiving parts is greater than the height of the coolant conduit in a state in which the heat dissipation fin is disposed between the adjacent electrode assembly receiving parts, it is not possible to maximally utilize the space in which the coolant conduit is located with the result that cooling efficiency may be lowered. On the other hand, if the sum of heights of outer edges of adjacent electrode assembly receiving parts is less than the height of the coolant conduit, the volume of the battery module is increased, and tight contact between the heat dissipation fin and the outer surface of each of the battery cells is not achieved with the result that cooling efficiency may be lowered.

Preferably, a coolant inlet port and a coolant outlet port of the coolant conduit are formed at regions where electrode leads of each of the battery cells are not formed such that that the coolant inlet port and the coolant outlet port of the coolant conduit structurally disturb the electrode leads of each of the battery cell. More preferably, the coolant inlet port and the coolant outlet port are formed at one side of the heat dissipation fin side by side.

In this structure, it is possible to manufacture a compact battery module and to greatly improve efficiency of a package during construction of a battery pack, as compared with a structure in which the coolant inlet port and the coolant outlet port of the coolant conduit are formed at different sides of the heat dissipation fin.

The distance between the coolant inlet port and the coolant outlet port may be 1.5 to 5 times the height of each of the electrode assembly receiving parts.

If the distance between the coolant inlet port and the coolant outlet port is too small, cooling efficiency may be lowered due to great thermal conduction difference between the coolant inlet port and the coolant outlet port via the heat dissipation fin. On the other hand, if the distance between the coolant inlet port and the coolant outlet port is too large, the length of the coolant conduit mounted to the heat dissipation fin is decreased according to the distance between the coolant inlet port and the coolant outlet port with the result that cooling efficiency may be lowered, and it may be difficult to design a compact battery module and a compact battery pack.

Meanwhile, the coolant is not particularly restricted so long as the coolant exhibits high cooling efficiency while easily flowing in the coolant conduit. For example, the coolant may be water, which contains high latent heat, thereby maximizing cooling efficiency.

In a preferred example, the module case may be provided at one side thereof with a plurality of openings, through which the coolant inlet ports and coolant outlet ports communicate with the outside. Preferably, the cooling members are disposed between the battery cells such that the coolant inlet ports and the coolant outlet ports of the cooling members are directed in the same direction.

Consequently, it is possible to minimize the volume of the battery module, and therefore, it is possible to manufacture a battery module that is compact and exhibits excellent cooling efficiency.

According to circumstances, a connector may be mounted to the outside of the battery module such that a cable to control the operation of the battery module can be connected to the connector to improve safety of the battery module.

Meanwhile, a middle or large-sized battery pack includes a plurality of battery cells to provide high power and large capacity. Consequently, it is necessary for battery modules constituting such a battery pack to exhibit higher heat dissipation efficiency such that safety of the battery modules is secured.

In accordance with another aspect of the present invention, there is provided a middle or large-sized battery pack manufactured by combining the battery modules based on desired power and capacity.

The battery pack according to the present invention includes a plurality of battery cells to provide high power and large capacity. Consequently, the battery pack is preferably used as a power source for an electric vehicle, a hybrid electric vehicle, or a plug-in hybrid electric vehicle, in which high-temperature heat generated during charge and discharge of the battery cells is a serious safety concern.

Particularly for the electric vehicle and the plug-in hybrid electric vehicle requiring high power through the battery pack for a long period of time, high heat dissipation efficiency is necessary. In this regard, the battery pack according to the present invention is more preferably used in the electric vehicle and the plug-in hybrid electric vehicle.

In accordance with a further aspect of the present invention, there is provided a cooling member to be mounted between adjacent battery cells, each of which includes an electrode assembly mounted in an electrode assembly receiving part.

Specifically, the cooling member may include a heat dissipation fin to be disposed between adjacent electrode assembly receiving parts in a tight contact state and a coolant conduit configured to have a hollow structure in which a coolant flows and mounted to the heat dissipation fin along outer edges of each of the electrode assembly receiving parts.

The cooling member having the aforementioned specific structure, which is a novel structure, may be used as a member to fix the battery cells using the coolant conduit and the heat dissipation fin, to greatly improve cooling efficiency, and to configure a compact battery module or a compact battery pack.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
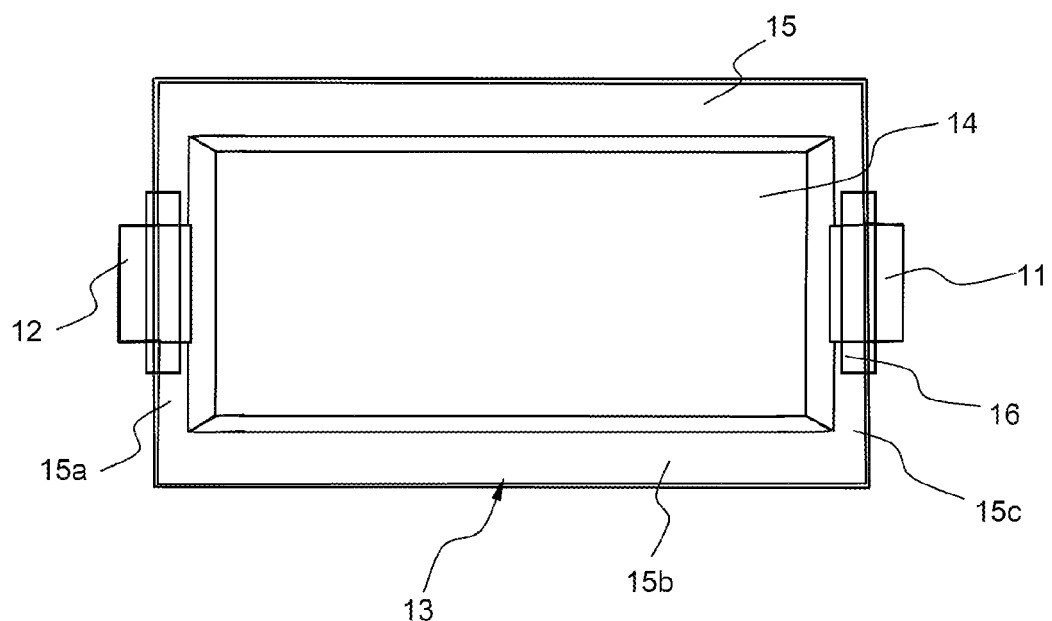
FIG. 1 is a plan view showing an exemplary plate-shaped battery cell mounted in a battery module according to the present invention.

FIG. 1 is a plan view typically showing an exemplary plate-shaped battery cell mounted in a battery module according to the present invention.

Referring to FIG. 1, a plate-shaped battery cell 10 is configured to have a structure in which two electrode leads 11 and 12 protrude from the upper end and the lower end of a battery case 13, respectively, such that the electrode leads 11 and 12 are opposite to each other.

The battery case 13 includes upper and lower battery cases formed of a laminate sheet including a metal layer and a resin layer. That is, the battery case 13 is a two-unit case. In a state in which an electrode assembly (not shown) of a cathode/separator/anode structure is mounted in an electrode assembly receiving part 14 formed at the inside of the battery case 13, outer edges of the electrode assembly receiving part 14, i.e. opposite sides 15b and upper and lower ends 15a and 15c of the battery case 13, are joined to each other by thermal welding to form a sealed portion 15, whereby the battery cell 10 is manufactured.

The electrode leads 11 and 12 protrude from the upper end 15a and the lower end 15c of the battery case 13, respectively. For this reason, the upper and lower ends 15a and 15c of the battery case 13 are thermally welded to each other, in a state in which film type sealing members 16 are interposed between the electrode terminal 11 and the battery case 13 and between the electrode terminal 12 and the battery case 13, in consideration of the thickness of the electrode leads 11 and 12 and the difference in material between the electrode leads 11 and 12 and the battery case 13, so as to increase sealability of the battery case 13.

Figure 2:
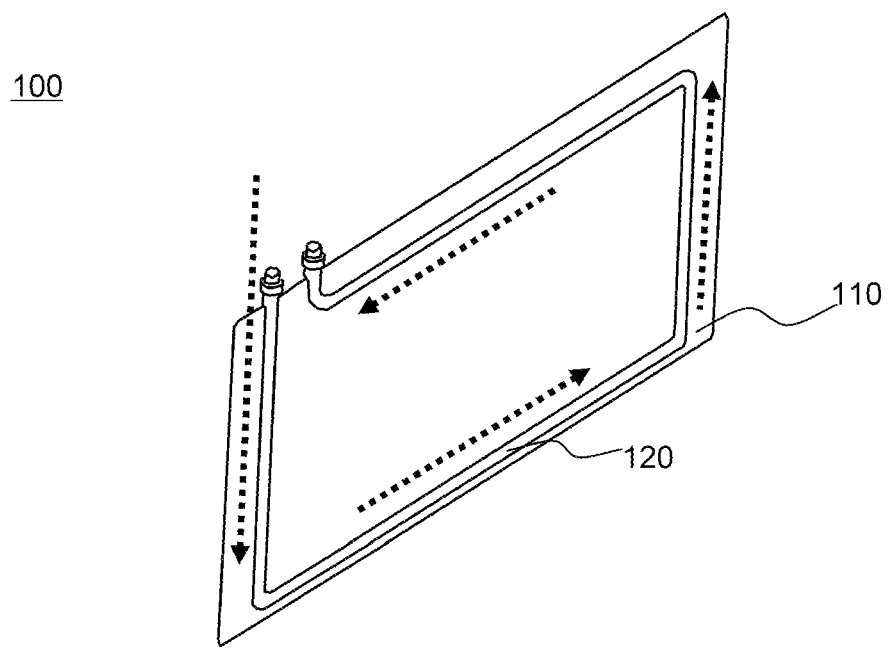
FIG. 2 is a perspective view showing a cooling member mounted in the battery module according to the present invention.

FIG. 2 is a perspective view typically showing a cooling member according to an embodiment of the present invention.

Referring to FIG. 2 together with FIG. 1, a cooling member 100 includes a plate-shaped heat dissipation fin 110, which is made of a metallic material, and a coolant conduit 120 penetrating the heat dissipation fin 110 in parallel and configured to have a hollow structure in which a coolant flows. The heat dissipation fin 110 and the coolant conduit 120 may be integrated.

Figure 3:
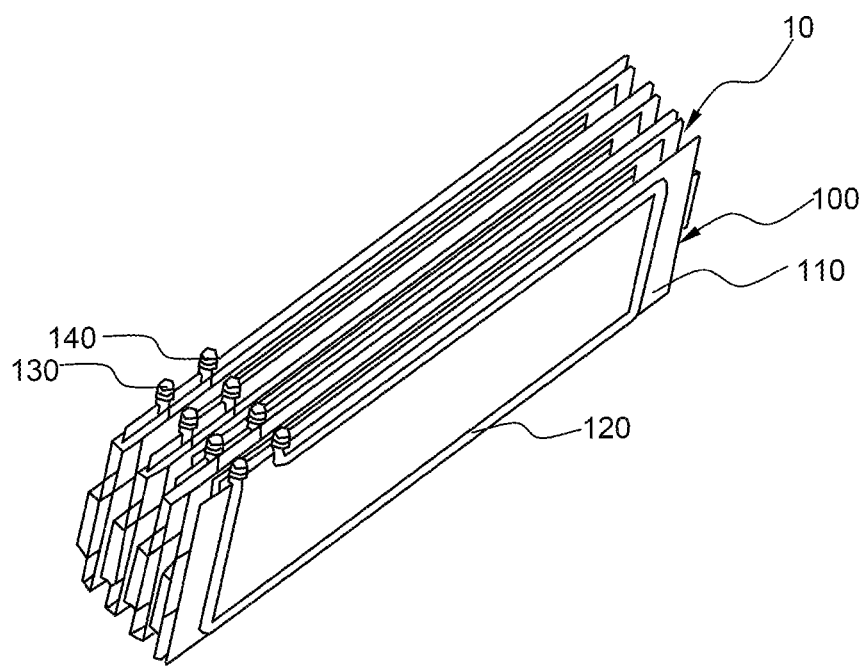
FIG. 3 is a perspective view showing a plurality of battery cells, one of which is shown in FIG. 1, and a plurality of cooling members, one of which is shown in FIG. 2.
Figure 4:
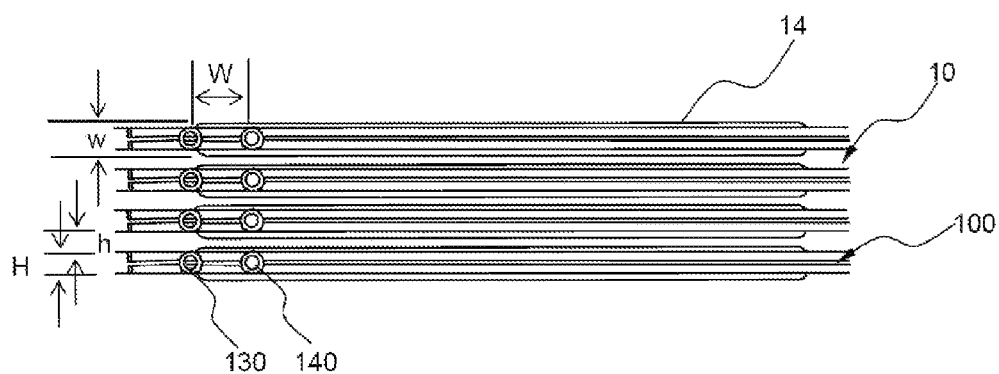
FIG. 4 is a plan view of FIG. 3.

FIG. 3 is a perspective view showing a plurality of battery cells, one of which is shown in FIG. 1, and a plurality of cooling members, one of which is shown in FIG. 2, and FIG. 4 is a plan view of FIG. 3.

Referring to these drawings together with FIGS. 1 and 2, cooling members 100 are mounted between corresponding battery cells 10.

The heat dissipation fin 110 of each of the cooling members 100 is disposed between adjacent electrode assembly receiving parts 14 in a tight contact state. The coolant conduit 120 is mounted to the heat dissipation fin 110 such that the coolant conduit 120 extends along the outer edge sealed portion 15 of each electrode assembly receiving part in a tight contact state. When the stacked structure is formed as shown in FIGS. 3 and 4, the cooling members 100 serve to fix the battery cells and provide improved mechanical strength.

Also, a height H of the coolant conduit 120 is equal to the sum h of heights of outer edges of adjacent electrode assembly receiving parts 14 in a state in which the heat dissipation fin 110 is disposed between the adjacent electrode assembly receiving parts 14. Consequently, the coolant conduit 120 improves cooling efficiency while having an overall compact structure.

A coolant inlet port 130 and a coolant outlet port 140 of the coolant conduit 120 are formed at one side of the heat dissipation fin 110 side by side on regions where the electrode leads 11 and 12 of each battery cell are not formed.

Also, a distance W between the coolant inlet port 130 and the coolant outlet port 140 may be, for example, 1.5 times a height w of the electrode assembly receiving part to achieve high cooling efficiency and compact design.

Figure 5:
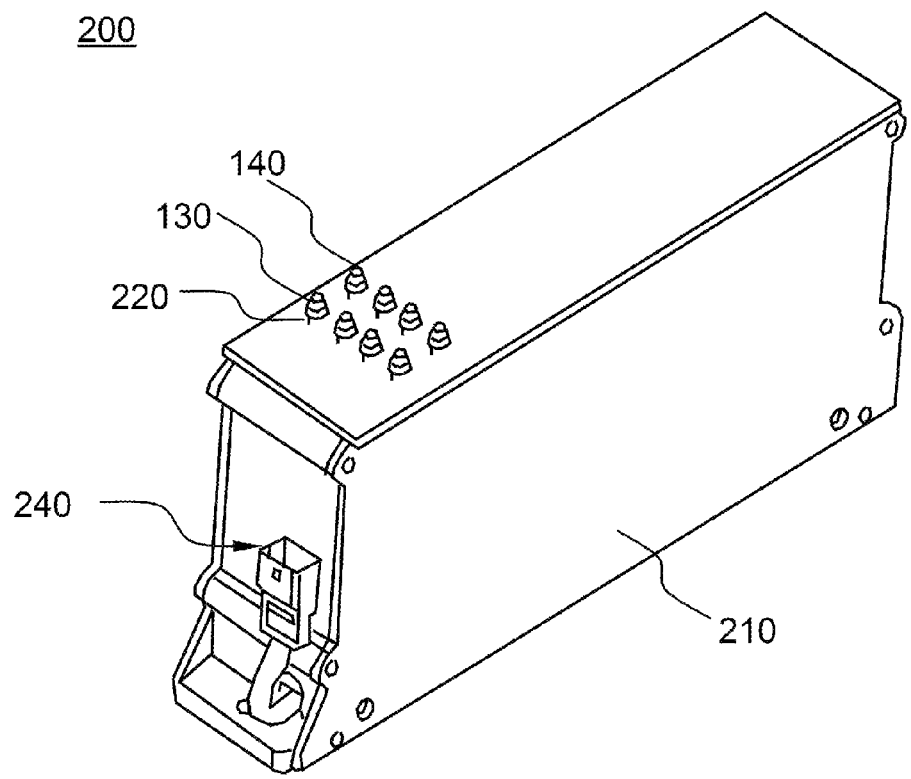
FIG. 5 is a perspective view showing a battery module according to an embodiment of the present invention.

FIG. 5 is a perspective view typically showing a battery module according to another embodiment of the present invention.

Referring to FIG. 5 together with FIGS. 3 and 4, a battery module 200 includes a module case 210 in which a plurality of battery cells 10 are arranged in the lateral direction such that electrode assembly receiving parts 14 of the respective battery cells 10 are adjacent to one another, a plurality of cooling members 100 disposed at interfaces between the respective battery cells 10, and a connector mounted to the outside of the battery module 200.

The module case 210 is provided at one side thereof with a plurality of openings 220, through which the coolant inlet ports 130 and the coolant outlet ports 140 communicate with the outside. The cooling members 100 are disposed between the battery cells such that the coolant inlet ports 130 and the coolant outlet ports 140 of the cooling members 100 are directed in the same direction. Consequently, it is possible to minimize the overall volume of the battery module.

Accordingly, the coolant, flowing along the coolant conduits 120, effectively removes heat conducted to the heat dissipation fins 110 mounted at the interfaces between the respective battery cells 10 to cool the respective battery cells 10, thereby providing high cooling efficiency. In addition, the battery module 200 is configured such that the battery module 200 has a compact structure although the battery module 200 provides such high cooling efficiency.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

INDUSTRIAL APPLICABILITY

As is apparent from the above description, a battery module according to the present invention is configured to have a structure in which a coolant conduit formed in a shape to support an electrode assembly receiving part is integrated with a cooling fin in a state in which the coolant conduit penetrates the cooling fin. Consequently, it is possible to maximize cooling efficiency of the battery module.

Also, coolant inlet ports and coolant outlet ports are disposed at one side of the battery module side by side. Consequently, it is possible to minimize the increase in size of the battery module.

Those skilled in the art will appreciate that various modifications, additions and substitutions are possible without departing from the scope and spirit of the invention as disclosed in the accompanying claims.

The invention claimed is:

1. A battery module comprising:
   a plurality of battery cells, each battery cell comprising:
      an electrode assembly;
      an electrode assembly receiving part having a rectangular shape; and
      an outer edge sealed portion formed at outer edges of the electrode assembly receiving part,
      wherein the electrode assembly receiving part has a thickness greater than a thickness of the outer sealed portion;
   the plurality of battery cells mounted in a module case, the battery cells arranged in a lateral direction such that the electrode assembly receiving parts of the battery cells are adjacent to one another; and
   at least one cooling member disposed between the respective battery cells, each of the cooling members comprising:
      a heat dissipation fin disposed between adjacent electrode assembly receiving parts in a tight contact state, the heat dissipation fin having a first major surface and a second major surface; and
      a coolant conduit configured to have a hollow structure in which a coolant flows and mounted to the heat dissipation fin to encircle the electrode assembly receiving part in a rectangular shape only along a periphery of the electrode assembly receiving part, the cooling conduit extending outwardly from both the first major surface and the second major surface of the heat dissipation fin,
   wherein the coolant conduit of each of the cooling members has a diameter equal to a sum of heights of outer edges of adjacent electrode assembly receiving parts,
   wherein the coolant conduit contacts the outer sealed portion of two adjacent battery cells, and
   wherein the heat dissipation fin is formed in the shape of a sheet, and the coolant conduit penetrates the heat dissipation fin in parallel.

2. The battery module according to claim 1, wherein each of the cooling members is formed of a metallic material exhibiting thermal conductivity.

3. The battery module according to claim 1, wherein the heat dissipation fin and the coolant conduit are integrated.

4. The battery module according to claim 1, wherein a height of the coolant conduit is equal to a sum of heights of outer edges of adjacent electrode assembly receiving parts in a state in which the heat dissipation fin is disposed between the adjacent electrode assembly receiving parts.

5. The battery module according to claim 1, wherein a coolant inlet port and a coolant outlet port of the coolant conduit are formed at regions where electrode leads of each of the battery cells are not formed.

6. The battery module according to claim 5, wherein the coolant inlet port and the coolant outlet port are formed at one side of the heat dissipation fin side by side.

7. The battery module according to claim 5, wherein a distance between the coolant inlet port and the coolant outlet port is 1.5 to 5 times a height of each of the electrode assembly receiving parts.

8. The battery module according to claim 1, wherein the coolant is water.

9. The battery module according to claim 1, wherein the module case is provided at one side thereof with a plurality of openings, through which coolant inlet ports and coolant outlet ports communicate with an outside.

10. The battery module according to claim 9, wherein the cooling members are disposed between the battery cells such that the coolant inlet ports and the coolant outlet ports of the cooling members are directed in the same direction.

11. The battery module according to claim 1, wherein a connector is mounted to an outside of the battery module.

12. A middle or large-sized battery pack of high power and large capacity comprising two or more battery modules according to claim 1 based on power and capacity.

13. The middle or large-sized battery pack according to claim 12, wherein the battery pack is used as a power source for electric vehicles, hybrid electric vehicles, or plug-in hybrid electric vehicles.

* * * * *